Patented Sept. 2, 1941

2,254,252

UNITED STATES PATENT OFFICE 2,254,252

PROCESS OF DENSIFYING AND SOLIDIFYING POROUS MASSES

Louis S. Wertz, Cleveland, Ohio

No Drawing. Application December 14, 1940,
Serial No. 370,174

15 Claims. (Cl. 61—36)

The present invention relates to a process of reinforcing and solidifying porous masses of earth, rock, masonry, concrete or the like with a fluid composition having the solids in suspension, which under the action of pressure may be forced into the voids and interstices of such porous masses so as to render them serviceable as regards strength and water tightness, and so as to render them resistant to the action of frost and to the action of corrosive water. The invention may be applied to the weatherproof restoration of old or disintegrated porous masses and may also be used in the solidification and weatherproofing of new constructions.

It is an object of the present invention to provide a process of solidifying concrete and masonry structures, or other porous masses, by forcing a fluid composition into the voids and interstices thereof to substantially fill all the void spaces within the mass with a homogeneous mixture of materials which will harden to form an integral part of the structure.

A further object is to provide a process of reinforcing porous masses by forcing a composition which may readily flow under pressure over long distances through small channels or fissures in the porous masses, and which will harden with a relatively small amount of shrinkage, and which when hardened may possess properties of rigidity, strength and impermeability equal to or greater than that of structures made from mortars or concrete mixes in the usual commercial manner.

It is a matter of common observation that many concrete and masonry structures, such as dams, bridges, walls, tunnel linings, and the like, exhibit internal imperfections which render them unsuitable for the services they were designed to perform. These imperfections are due to a variety of causes, such as poor workmanship at the time when the structure was built, to the dissolution of soluble compounds by percolating waters, and to the disruptive action of frost. Regardless of the cause, the imperfections take the form of cracks, crevices, honeycomb, and a general lack of density and solidarity, rendering the structure deficient as regards water tightness and strength.

In the past, attempts have been made to repair such structures by drilling holes to the interior and forcing into these holes a thin mortar, slurry, or grout, comprising a mixture of Portland cement and water. The examination of cores taken from structures thus treated has disclosed that this method of repair is ineffective in filling the smaller voids, that such mixtures can be forced only for very short distances through small channels before plugging occurs, and that in larger voids there occurs a settlement of the cement, and a consequent rise of water to the top of the void space before hardening, and a shrinkage of the volume of slurry as setting and hardening takes place, as a consequence of which the material within the void space is lacking in homogeneity, the space is incompletely filled with hardened cement paste, and there is a lack of bond or adhesion between the hardened paste and the concrete or stone surrounding the void.

Another object is to provide a process of densifying and solidifying concrete structures and the like wherein the voids, cracks, crevices, etc., may be substantially filled by a composition in which the cement and other solid materials will remain uniformly distributed until solidification takes place, and which will have very little shrinkage upon setting.

Another object is to provide a process of densifying and solidifying concrete structures and the like by forcing a composition which will readily flow under pressure and without separation into the voids and interstices of a porous or honeycombed concrete mass, so that the voids may be substantially filled without separation of the material and the composition may be allowed to set and will firmly adhere to the existing structure.

When large dams are constructed it has frequently been found that deleterious seepage around the dam frequently occurs to a depth of 100 or 200 feet below its base. To reduce this seepage it has been customary to force at high pressure, such as 1000 lbs./sq. in., a very thin, watery slurry of Portland cement into the earth at the base of the dam. This thin slurry is then followed with a thicker material to solidify the earth.

The high pressure initially used causes relatively large channels to open in the direction of least resistance to flow, and the solidifying material which is later forced into the opening follows these channels without entering the great mass of voids. The desired solidification of the dam foundation is, therefore, not obtained.

It is, therefore, an important object of this invention to provide a process for densifying earth, gravel and rock strata wherein the voids are filled, in order to render them more suitable for foundations of dams, buildings and the like.

It has been found that the tendency of Portland cement slurries to plug channels many times the size of the largest cement grains is due to several causes, among which are the flocculation or agglomeration of small particles of cement to form clusters or clumps, the rapid hydration of the smaller particles of cement to form a viscous gel, the particle interference or frictional resistance to the sliding of one particle over another, and the lack of water retaining capacity of the slurry. This latter property is commonly referred to as bleeding.

All Portland cements contain compounds of lime, silica, iron and aluminum. When water is added to Portland cement, hydration begins, and during the early stages of hydration, known as "setting," precipitation of aluminum and calcium hydroxide occurs to some extent. The charge of the metallic cations of these precipitated hydroxides is positive, while the charge on the unhydrated basic cement particles is negative. There is, therefore, a natural tendency in Portland cement for the precipitated hydroxide to cause flocculation of the suspended cement particles.

Since the concentration of aluminum ions is for the first few hours relatively larger than that of other compounds, and since, in the compounds of aluminum, the metallic ions are relatively highly charged, the aluminum may be considered as the most powerful factor in causing agglomeration of the cement particles in a slurry.

Aluminum hydroxide or the hydrous oxide of aluminum is very hydrophillic, rapidly combining with large quantities of water to form a viscous gel which produces great increases in viscosity or decreases in the mobility of the slurry. This phenomenon is commonly referred to as the setting of the cement.

I have found that the formation of the gels, or the early stiffening of the slurry, may be materially retarded by adding a quantity of acidic colloidal silica or pozzolanic material. Being in a finely divided state, the particles also act to physically separate and to maintain in suspension the particles of cement, and to prevent the agglomeration of the cement grains. The pozzolana, or finely divided siliceous materials thus act under certain conditions as a protective colloid. The acidic colloidal silica or colloidal material which produces some silicic acid may be added in various finely divided forms of the complex mineral silicates, such as are present in blast furnace slag, fly ash, and certain natural silicious materials generally classified as pozzolana, forming compounds having considerable cementitious value with the lime that may be liberated as a by-product during the setting of the cement. Some types of blast furnace slag are hydraulically active in themselves and are very desirable.

In addition to retarding the formation of the gel, such silicates are advantageous in that the acidic colloidal silica in these materials slowly combines with the active calcium hydroxide which is liberated during the process of hydration of Portland cement to produce insoluble calcium silicate that contributes to both strength and the impermeability of the hardened cement composition. Moreover, such materials act as fillers and reduce the volumetric shrinkage that takes place during the setting or hardening of the slurry.

A Portland cement slurry containing a filler that is pozzolanic, or that has acidic colloidal silica, may be further improved as a material for solidifying concrete structures by the addition of an agent or agents to form a stable suspension of the cement and filling material in water, and to act as a lubricant to facilitate the pumping and flowing of the material into place.

Agents that are generally satisfactory for plasticizing and lubricating the cement slurry are oleaginous materials, including fatty acid glycerides, the fatty acids themselves, and salts and esters thereof, and in particular the stearates and oleates. An especially desirable oleaginous material for increasing plasticity and flowability is mineral oil. However, since mineral oil has an adverse effect on the strength of the solidified composition, it is desirable to use a mixture of mineral oil with one of the other lubricating and plasticizing agents, such as the fatty acid salts. Although a number of agents of this class may form insoluble soaps with lime, it appears that the liberation of lime from the cement mix is so slow that only a very small amount of such insoluble soaps would be formed during the placement fo the cement slurry. The esters and salts of the fatty acids apparently, however, hydrolize in the aqueous mixture so that the fatty acid constituent assists in forming and maintaining the suspension of the solids and also provides lubrication between the particles.

Other agents may be used to aid in maintaining a stable suspension and to assist flow of the cement slurry, including the solids of the pozzolanic type. Some of them are powerful in forming the suspension and a very small quantity is required; others are more important to maintain the solid materials in suspended condition. Such agents generally have an adverse effect on the strength of the hardened cement composition when used in substantial quantities. However, with small amounts, a substantial increase in the stability of the slurry may be obtained without a substantial decrease in strength. Agents of this type include stabilizing agents, such as the alginates, gelatin, glue, casein, bentonites, gum tragacanth, and the like. The more powerful wetting agents, as the alkylated sulphonated aromatic compounds and salts thereof, or compounds which are obtained by condensing formaldehyde with a polynuclear aromatic sulfonic acid, or lignin sulfonicacids or derivatives thereof may be used, but they should be used in very small quantities.

The quantity of agent to be added to the slurry depends upon the type used. The agents that are generally satisfactory for plasticizing and lubricating the cement slurry, such as the oleaginous materials, and particularly the alkali stearates and oleates, may be used advantageously in quantities up to 1% or 2% by weight of the Portland cement. However, when agents of the wetting or emulsifying type, such as the sulphonates, higher alcohols, sulphonic acid derivatives, etc., mentioned above, which do not generally precipitate in the cement slurry, are used, only a small quantity of such agents should be used, such as about .1% to .3%, or so, by weight of the cement.

However, if an agent of the plasticizing and lubricating type, such as the oleaginous materials, and also one of the agents having a more powerful effect in producing a stable suspension, be used, a less quantity of the oleaginous material is usually preferred.

The quantity of finely divided silicious material or acidic colloidal silica used will depend upon the character and qualities desired in the resulting slurry and hardened cement. Usually the silicious material and Portland cement may be used advantageously in about equal proportions. Depending upon the type of silicious material used and the properties desired in the slurry, the above proportion can be varied considerably. The silicious material may vary from an amount equal to half the Portland cement used to an amount twice that of the Portland cement. When using water quenched blast furnace slag, optimum results are usually obtained when the proportion of slag to cement is 1:1 or 1½:1.

The fluidity or the ability of a cement mixture to be pumped through fine openings without clogging them is increased by the addition of protective colloids, such as the alginates, gelatin, glue, casein, bentonites, gum tragacanth, and the like, which have a stabilizing effect on the mixture, permitting the production of more stable suspension having relatively high fluidity. The use of the hereinbefore mentioned materials containing acidic colloidal silica, such as finely ground shales, blast furnace slag, etc., is preferred, since, in addition to their action as protective colloids in maintaining the stability of the slurry, they retard the set and provide some additional strength in the hardened material. A very small percentage of one of the more powerful wetting agents may be advantageously used in addition to the finely ground solids to obtain increased stability of the slurry.

When the interstices in a concrete structure are small, it is preferable that the material be pulverized sufficiently so that all of it will pass through a 100-mesh screen. For example, excellent results have been achieved with a mixture having 1 part of Portland cement and 1½ parts of granulated, water quenched blast furnace slag which has been pulverized to a sufficient fineness to pass through a 100-mesh screen, and which has a surface area of at least about 2,200 sq. cm. per gram. To this mixture there is added 12 to 15 gallons of water per sack of cement and a sufficient quantity of an emulsion containing an alkali salt of stearic acid to furnish 1 to 1½ lbs. of stearate per sack of cement. Good results have been achieved by using equal parts of Portland cement and fly ash of low carbon content, for which the fineness, as measured in terms of surface area, has varied from 2,500 to 3,500 sq. cm. or more per gram.

It has been found that a portion or all of the oleaginous material in the above composition may be mineral oil. Mineral oil, however, should only be used in relatively small amounts, such as, for example, up to 1% by weight of the total cement and slag and, when so used, does not seriously affect the strength of the composition when solidified and does contribute materially to the plasticity, flowability and stability of the suspension. It is frequently desirable to replace only a portion of the stearate with mineral oil, thus obtaining the benefits of both ingredients.

A suitable quantity of any chemically active silicious material of volcanic or diatomaceous origin, such as volcanic ash, tuff, diatomaceous earth and shale, or other material having similar properties, may be substituted for blast furnace slag with good results in the above example. These materials may be either added to the cement clinker and ground with the cement, or separately added to the cement in a finely divided form.

While any commercial Portland cement can be employed, it has been found that best results are achieved with a cement that is fairly low in the compound tricalcium aluminate and a cement of such fineness that the surface area will be in the neighborhood of 1,600 to 1,800 or more sq. cm. per gram, with all particles passing a screen of 100 meshes to the inch and a relatively small percentage of particles having a mean diameter of less than 5 microns.

It will thus be seen that the cement slurry should have included in its ingredients, in addition to the cement and water, ingredients which have the properties of forming and maintaining a stable suspension of the solids in the water, retarding the set of the cement, and lubricating or increasing the flowability of the slurry through voids and interstices of a structure or mass. Certain of the ingredients of the slurry may perform more than one of these functions, such as the finely ground blast furnace slag, shale, etc., which aid in forming and maintaining a stable suspension by acting as protective colloids for the cement as well as tending to retard the gellation of the cement. By varying the proportions of the ingredients and using care in the selection of them, a cement slurry can be made up which will have the desired stability of suspension, the desired flowability, and will not gel until the material has been forced into the finest cracks and interstices of the structure or mass being solidified.

It has been found that a concrete or masonry structure which is internally defective as regards the presence of cracks, cavities, and large or small void spaces in general, may be economically and efficiently repaired so that it is substantially free from such imperfections by the use of properly proportioned mixtures of Portland cement, chemically active, finely divided silicious materials, such as those previously named, and wetting, plasticizing, lubricating or dispersing agents, such as those previously mentioned, together with water sufficient to produce a slurry, grout, or paste of the required consistency. The composition may be forced for long distances through voids and channels with a minimum of frictional resistance. It will retain its fluidity and mobility for an hour or more, and the solids will remain in suspension without tendency towards flocculation or agglomeration, or without appreciable settlement. The composition hardens without appreciable shrinkage or water gain, and when hardened is impervious, tenaciously bonds to its surroundings, and is of high tensile and compressive strength.

Briefly, an illustration of the process of repair is as follows:

A plurality of holes are formed, as by drilling, in the surface of the concrete or masonry mass to a predetermined level, and according to a predetermined pattern, the holes may be washed with water to flush out loose materials from the voids and pockets of the porous interior of the concrete or masonry mass, and air under pressure may be supplied to the holes to displace the water or other washing liquid.

The composition is next supplied to the holes under pressure to force it into all interstices, voids, fissures, etc., in the region of the concrete or masonry adjacent the holes. The pressure is maintained, as by continuing the pumping after substantial flow of the material ceases, and the composition is allowed to set under pressure for a period of time before the pressure is released, so that it will enter the finer voids and remain in place, and become firmly bonded to the existing concrete of the structure. If the concrete or masonry structure is of such a thickness that the voids and interstices cannot be thoroughly filled at the depth level of the holes, the holes may be drilled to a further depth level through a portion of the structure just treated, where the process steps of flushing, filling, allowing the repair material to set, and drilling may be repeated as many times as desirable or necessary in order to solidify or densify the concrete structure. When it is desirable to carry the filling process to further than a single depth, the filling operation is preferably done at depth increments of about two or three feet, and the composition may be supplied to the holes by air pressure, or under pressure by a suitable pump.

After the interior of the structure has been densified and solidified, it may be desirable that the surface of the structure be treated by a process which will render it impervious, so that deleterious substances, such as moisture, cannot gain access to the interior of the structure and cause deterioration or disintegration thereof. Such a process is one in which a suitable weatherproofing composition is applied to the surface of the structure in any suitable manner and is thoroughly worked into the surface. It has been found that when a weatherproofing composition is applied under pressure, and simultaneously worked into the concrete by means of an abrasive, as an annular power-driven carborundum wheel, all surface projections are removed and all surface voids are filled, thereby providing a structure having a smooth surface of uniform color which is, in itself, dense and durable to an appreciable thickness.

In the solidification of earth, rock and gravel strata, such as are present at dam and building suites, a properly proportioned mixture of Portland cement, chemically active, finely divided silicious materials, such as those previously named, sufficient water to make a slurry, and preferably with one or more of the above mentioned plasticizing or lubricating agents, is used in the same manner as in the case of the solidification of other porous structures such as concrete or masonry. The composition may be forced through long distances through voids or channels in the rock, gravel and earth strata, with a minimum of frictional resistance, so that cracks and crevices which may provide passages for the seepage of water under the dam, etc., are effectively sealed.

When it is desired to densify and solidify these earth, rock, or gravel strata, holes are drilled to a predetermined depth, usually about 50 feet or so, and the material forced into the holes under positive pressure, which may be as high as 500 or 1000 lbs./sq. in. Usually a pressure of about 300 or 400 lbs./sq. in. is used, and the pressure is maintained on the cement for a considerable time to allow it to flow into the smaller voids as well as the larger ones and to allow the slurry to set under pressure. After solidifying the material at one level, holes may be drilled through the solidified material to a greater depth, etc., until the foundation material is solidified to a depth of 200 or 300 feet if desired. Because the pressure used is usually insufficient to open a channel in the foundation, and because the mixture used does not readily clog the voids, the desired solidification of voids of all sizes occurs.

This application is a continuation-in-part of my co-pending applications Serial No. 194,933, filed March 9, 1938, and Serial No. 280,141, filed June 20, 1939.

It is to be understood that the particular steps of the process described in detail for purposes of explanation and illustration may be varied without departing from the spirit of my invention.

What I claim is:

1. The process of repairing concrete structures, which comprises forming a stable emulsion of oleaginous material and water having added thereto substantially equal parts of Portland cement and finely divided, water quenched, blast furnace slag, forcing said emulsion under pressure into the voids and interstices, and holding said emulsion under pressure until set.

2. The process of reinforcing and solidifying porous masses of earth, rock, masonry, concrete and the like, which comprises combining Portland cement, a finely divided material containing acidic colloidal silica, oleaginous material and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

3. The process of reinforcing and solidifying porous masses of earth, rock, masonry, concrete and the like, which comprises combining hydraulic cement, water, a finely divided material containing acidic colloidal silica and a suspension stabilizing agent, thoroughly mixing the combined ingredients to obtain a stable, homogeneous suspension, and forcing the suspension into the voids and interstices of the mass while the suspension is plastic and before stiffening of the suspension due to gellation of the cement takes place.

4. The process of reinforcing and solidifying porous masses of earth, rock, masonry, concrete and the like, which comprises combining Portland cement, a material containing acidic colloidal silica, a suspension stabilizing agent and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

5. The process of reinforcing and solidifying porous masses of earth, rock, masonry, concrete and the like, which comprises combining Portland cement, one-half to two parts for each part of cement of a finely divided material containing acidic colloidal silica, oleaginous material and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

6. The process of reinforcing and solidifying porous masses of earth, rock, masonry, concrete and the like, which comprises combining Portland cement, one-half to two parts for each part of cement of a finely divided material containing acidic colloidal silica, a lubricating and plasticizing material to increase flowability, and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

7. The process of reinforcing and solidifying porous masses of earth, rock, masonry, concrete and the like, which comprises combining Portland cement, a finely divided material containing acidic colloidal silica, a member of the group consisting of fatty acids, fatty acid esters, fatty acid salts and mineral oil, and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

8. The process of reinforcing and solidifying porous masses of earth, rock, masonry, concrete and the like, which comprises combining Portland cement, a finely divided material containing acidic colloidal silica, a salt of a fatty acid, and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

9. The process of reinforcing and solidifying porous masses of earth, rock, masonry, concrete and the like, which comprises combining Portland cement, finely divided, water quenched blast furnace slag, a salt of a fatty acid, and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

10. The process of reinforcing and solidifying porous masses of earth, rock, masonry, concrete and the like, which comprises forming an aqueous slurry having in suspension Portland cement, one-half to two parts for each part of cement of a finely divided material containing sufficient acidic colloidal silica to retard gellation of the cement, and up to about 2% of oleaginous material to maintain the cement and the material in suspension and render the slurry highly plastic and flowable and capable of penetration through fine voids and interstices, and forcing the slurry into the voids of the porous mass undergoing solidification.

11. The process of reinforcing and solidifying porous masses of earth, rock, masonry, concrete and the like, which comprises forming an aqueous slurry of hydraulic cement, water, a finely divided material containing acidic colloidal silica, a salt of a fatty acid, and mineral oil, thoroughly mixing the slurry to obtain a stable, homogeneous suspension which is highly flowable and plastic and capable of penetrating fine voids and interstices without separation of the ingredients, and forcing the suspension into the voids of the mass undergoing solidification.

12. The process of reinforcing and solidifying porous masses of earth, rock, masonry, concrete and the like, which comprises combining Portland cement, finely divided, water quenched blast furnace slag, up to about 2% of a salt of a fatty acid and mineral oil, and water, mixing the combined ingredients to obtain a homogeneous, stable emulsion which is highly flowable and plastic and capable of penetrating fine voids and interstices without separation of the ingredients, and forcing the suspension into the voids of the mass undergoing solidification.

13. The process of densifying and solidifying concrete structures which comprises pumping a repair material having the property of remaining in stable suspension into voids and interstices of the structure, continuing said pumping after the flow of material into the structure ceases, maintaining pressure on said repair material until it becomes firm enough to stay in place, whereby the finer voids and interstices of the structure are filled by the higher pressures built up because of the increased resistance to pumping.

14. The process of densifying and solidifying concrete structures which comprises preparing a relative fluid suspension of finely divided repair material capable of penetrating fine voids and interstices without separation of the ingredients, forcing such material under pressure into the voids and interstices of the structure, and maintaining pressure on said repair material until it becomes firm enough to stay in place.

15. The process of densifying and solidifying porous masses, which comprises drilling holes in the mass, preparing relatively fluid, stable suspension of plastic material of high flowability, pumping such material through the holes into the voids and interstices of the mass until the flow of material substantially ceases, and maintaining pressure on the fluid material until it becomes solidified sufficiently to remain in place.

LOUIS S. WERTZ.